Figure 1:
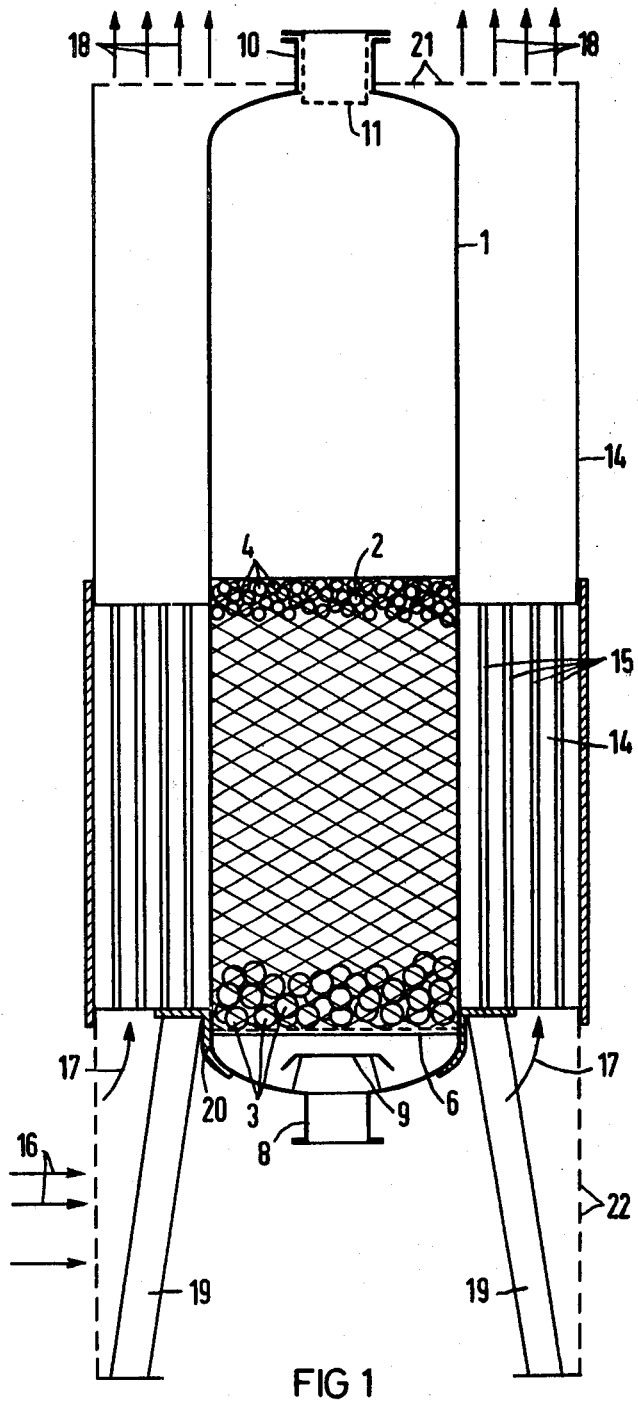

United States Patent [19]

Donath

[11] Patent Number: 4,460,464
[45] Date of Patent: Jul. 17, 1984

[54] ELECTROMAGNETIC FILTER

[75] Inventor: Gerhard Donath, Rathsberg, Fed. Rep. of Germany

[73] Assignee: Kraftwerk Union Aktiengesellschaft, Mülheim, Fed. Rep. of Germany

[21] Appl. No.: 374,245

[22] Filed: May 3, 1982

[30] Foreign Application Priority Data

May 13, 1981 [DE] Fed. Rep. of Germany ....... 3119034

[51] Int. Cl.³ .......................................... B01D 35/06
[52] U.S. Cl. ...................................... 210/223; 55/100
[58] Field of Search .............. 210/222, 223, 243, 290, 210/504, 506, 695; 428/328, 692; 55/3, 100; 204/302, 304, 305, 306, 307, 308, 186

[56] References Cited

U.S. PATENT DOCUMENTS

| | | | |
|---|---|---|---|
| 3,283,908 | 11/1966 | Komarmy et al. | 210/506 |
| 3,539,509 | 11/1970 | Heitmann et al. | 210/222 |
| 3,657,119 | 4/1972 | Turbeuille | 210/222 |
| 3,869,390 | 3/1975 | Heitmann et al. | 210/222 |
| 4,309,290 | 1/1982 | Heitkamp | 210/222 |

FOREIGN PATENT DOCUMENTS

| | | | |
|---|---|---|---|
| 53-37961 | 7/1976 | Japan | 210/222 |
| 3131576 | 11/1978 | Japan | 210/223 |
| 6105717 | 8/1981 | Japan | 210/222 |
| 6124412 | 9/1981 | Japan | 210/222 |
| 6152718 | 11/1981 | Japan | 210/222 |

Primary Examiner—Peter A. Hruskoci
Assistant Examiner—John W. Czaja
Attorney, Agent, or Firm—Herbert L. Lerner; Laurence A. Greenberg

[57] ABSTRACT

Electromagnetic filter, including a housing through which medium to be filtered flows, spherical bodies of ferromagnetic material disposed in the housing, a winding for magnetizing the spherical bodies, the spherical bodies having surfaces and particles of higher permeability than the spherical bodies being disposed in the surface with spacings therebetween.

9 Claims, 3 Drawing Figures

U.S. Patent

Jul. 17, 1984

4,460,464

ELECTROMAGNETIC FILTER

The invention relates to an electromagnetic filter with a winding for magnetizing spherical bodies of ferromagnetic material in a housing, through which the medium to be filtered flows.

Electromagnetic filters of the above-mentioned type are described, for instance, in the brochure VGB Feedwater Convention 1972, pages 80 to 92, under the title "Operating Experience with Electromagnetic Filters and the Application in the Water-Stream Loops of Power Generating Plants". The spheres are formed of steel or soft iron. The spheres have diameters of about 6 mm and are operated at magnetic field strengths of about 150,000 A/m. It is thereby possible to separate ferromagnetic particles, especially magnetite, which occurs in the water and steam pipes of power plants that are formed of ferrometallic material.

It is an object of the invention to provide an electromagnetic filter and method of manufacture thereof, to improve the degree of separation of such filters. In particular, also suspended paramagnetic substances, for instance $\alpha\text{-}Fe_2O_3$ are to be separated, for which mechanical filters have been used heretofore, although they are considered to be disadvantageous, because of their high flow resistance and the need for replacement when they are exhausted as compared to electromagnetic filters of the above-mentioned type which are not consumed but can be cleaned by flushing.

With the foregoing and other objects in view there is provided, in accordance with the invention, an electromagnetic filter, comprising a housing through which medium to be filtered flows, spherical bodies of ferromagnetic material disposed in the housing, a winding for magnetizing the spherical bodies, the spherical bodies having surfaces, and particles of substantially higher permeability than the spherical bodies being disposed in the surface with spacings therebetween. With such particles which are separated, i.e. are spaced from each other on the spherical surface, field strength gradients are produced which are several times higher than with homogenous spherical surfaces. Such large magnetic field strengths also allow the accumulation of paramagnetic suspended substances without losing the possibility of cleaning, which exists for electromagnetic filters with spheres, or appreciably increasing the flow resistance.

In accordance with another feature of the invention, the spherical bodies include a magnetic spherical base body into which the particles are rolled.

In accordance with a further feature of the invention, the particles are formed of amorphous metals. For instance, particles of an amorphous magnetically soft magnetic alloy with an Fe and Ni base can be used. These particles have an initial magnetic permeability of about 100,000 as compared to the values of about 1000 of the steel used as the spherical base material. They are extremely hard and can thereby be rolled into a spherical magnetic base body, for instance of steel, so that a smooth surface is provided in spite of the particles.

In accordance with an added feature of the invention, there are provided non-magnetic layers disposed on the spherical bodies into which the particles are embedded.

In accordance with an additional feature of the invention, the layers are formed of material from the group consisting of synthetic resin and glass or the like. This is done so that the smooth spherical surface, which is advantageous for operation, is preserved. The thickness of the layer is, as far as possible, in the range of the particle size and is, for instance, 10 to 50 $\mu$m, so that the highest field strength caused by the particles is present at the surface of the sphere, i.e. on the upper surface of the layer.

In accordance with again another feature of the invention, the particles are disposed in a raster having a pitch being of the same order of magnitude as the dimensions of the particles to be separated.

In accordance with again an added feature of the invention, the size of the particles and the raster pitch are substantially between 1 and 40 $\mu$m. In this connection, it should further be noted that "raster" is not meant to be a mathematically exact configuration but only a regular arrangement of particles with spacings inbetween which are required for obtaining high field strengths by the individual particles separated from each other.

In any case, the particles should not be joined together, touching each other.

In accordance with again an additional feature of the invention, there are provided spheres without particles disposed in the housing in a ratio of 1:1 with the spherical bodies having the particles. To this end, the spheres are disposed advantageously in the same housing and are magnetized by a common coil.

In accordance with yet another feature of the invention, the spherical bodies having the particles are disposed downstream of the spheres without particles in flow direction of the medium. In other words they are in the upper part if the flow is from the bottom up, because the spheres without particles then accumulate larger suspended ferromagnetic substances, while the spheres with particles become subsequently effective for the separation of paramagnetic suspended matter.

In accordance with yet a further feature of the invention, the spherical bodies having the particles have smaller diameters than the spheres without particles. The diameter difference may advantageously be 2 mm, for instance, so that spheres with a diameter of 6 and 4 mm are used.

In accordance with the procedure for making the particles, there is provided a method for manufacturing spheres of ferromagnetic material to be magnetized with a winding in an electromagnetic filter housing, which comprises milling amorphous metals to powder, mixing the powder with plastic, and applying the mixture to steel balls. The plastic may be present for mixing in liquid form, such as a monomer or in solution. However, plastic granulate can also be processed.

Other features which are considered as characteristic for the invention are set forth in the appended claims.

Although the invention is illustrated and described herein as embodied in an electromagnetic filter and method of manufacture thereof, it is nevertheless not intended to be limited to the details shown, since various modifications and structural changes may be made therein without departing from the spirit of the invention and within the scope and range of equivalents of the claims.

Figure 2:
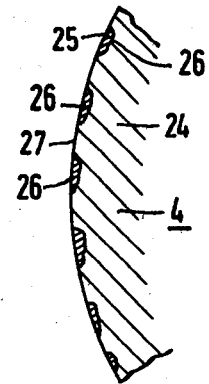
Figure 3:
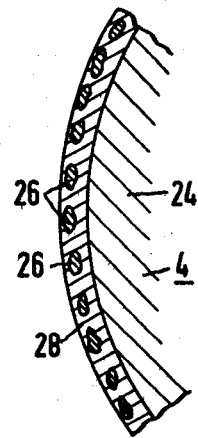

The construction and method of operation of the invention, however, together with additional objects and advantages thereof will be best understood from the following description of specific embodiments when read in connection with the accompanying drawings, in which:

FIG. 1 is a diagrammatic elevational view of an embodiment of an electromagnetic filter with its essential parts shown in a greatly simplified presentation; and FIGS. 2 and 3 are greatly enlarged fragmentary cross-sectional views of spheres of the invention.

Referring now to the figures of the drawing and first particularly to FIG. 1 thereof, it is seen that in a cylindrical filter container 1, a filter bed 2 is disposed in the form of a ball charge; the individual balls 3 in the lower half of the device are magnetic steel balls of 6 mm in width and are optionally provided with a coating serving as a rust protection. Thus, the balls 3 may, for instance, be nickel plated or chromium plated.

The balls 4 in the upper half of the ball charge, i.e., in the downstream half as seen in the flow direction, have a diameter reduced by 2 mm to 4 mm and they are formed of the same steel, into which magnetically soft particles with an iron and nickel base are rolled. The permeability of the particles is higher by at least a factor 5, and preferably by a factor of 20 to 100, as compared to that of steel.

The balls 4 together with the balls 3 rest on a screen plate 6. The liquid to be purified, such as boiler feedwater, flows into the filter container from below through an inlet flange 8, is then distributed by a baffle plate 9 and flows through the filter bed 2 in a nearly uniformly distributed manner over the entire area of the screen plate 6. The purified liquid leaves the filter container 1 through an exit flange 10. A screen body 11 prevents balls that have been taken along from leaving the filter container 1.

The filter container 1 is surrounded by an exciter coil 14 which is constructed for large electric power. For cooling, air gaps 15 are formed between individual turns or a plurality of turns which allow cooling air entering in the direction of the arrows 16 and 17 to pass. The cooling air flows upwards in the direction of the arrows 18.

The entire arrangement is supported by a support frame 19; an annular body 20 which is provided with cutouts serves for supporting the coil 14 as well as the filter container 1. The height and arrangement with respect to the filter bed of the coil 14 are chosen in such a way that the ball charge 2 extends upward and downward by about 10 cm beyond the boundaries of the coil 14. The filter is covered at the top with a perforated sheet 21 and at the bottom with a perforated sheet 22.

The electric power of the coil 14 not only has high values for exciting the filter, but large demagnetizing currents are also necessary for the flushing process since the filter bed 2 requires not only a large amount of magnetizing energy, but the magnetic balls 3, 4 also require correspondingly high magnetic fields for demagnetizing. To generate the d-c operating voltage, a thyristor control can be used which is constructed in such a way that it also serves for demagnetizing; a decaying a-c voltage of low frequency or a chopped d-c current of alternatingly opposite polarity allows a lowering of the magnetism down to zero.

FIG. 2 shows details of the balls 4 in an exaggerated scale. In the figure there is seen a base body 24 which is formed of magnetic steel and has a diameter of 4 mm. Particles 26 are placed by rolling into the surface 25 of the base body 24. The particles 26 are formed of amorphous metals with a permeability substantially higher than the steel of the base bodies of the balls. The particles with an iron and nickel base are shown on an enlarged scale; they have dimensions of about 40 $\mu$m.

FIG. 2 shows that the individual particles 26 sit in the surface while being separated from each other, i.e., a space 27 is provided between two adjacent particles 26, in which the steel of the base body forms the surface of the sphere. This results in a raster arrangement with a raster pitch of the same order of magnitude as the particle size.

In the embodiment example according to FIG. 3, a layer 28 is applied to a spherical base body of magnetic steel. The layer 28 may, for example, be 50 $\mu$m thick and be formed of plastic, such as polytetrafluoroethylene, polyamide or the like, in which particles 26 spaced from each other are embedded. The particles 26 may again be of amorphous metal. They are applied, for instance, in the form of a mixture with the plastic on the spherical base body 24.

The foregoing is a description corresponding to German application P No. 31 19 034.0, dated May 13, 1981, the International priority of which is being claimed for the instant application, and which is hereby made a part of this application. Any discrepancies between the foregoing specification and the aforementioned corresponding German application are to be resolved in favor of the latter.

I claim:

1. Electromagnetic filter, comprising a housing through which medium to be filtered flows, spherical bodies of ferromagnetic material disposed in said housing, a winding for magnetizing said spherical bodies, said spherical bodies having surfaces, and particles of magnetic permeability at least five times higher than that of said spherical bodies, said particles being disposed in substantially regular arrangement in and over the entire surface, respectively, of said spherical bodies with spacings of about 1 to 40 $\mu$m therebetween.

2. Electromagnetic filter according to claim 1, wherein said spherical bodies include a magnetic spherical base body into which said particles are rolled.

3. Electromagnetic filter according to claim 1, including nonmagnetic layers disposed on said spherical bodies into which said particles are embedded.

4. Electromagnetic filter according to claim 3, wherein said layers are formed of a material from the group consisting of synthetic resin and glass.

5. Electromagnetic filter according to claim 1, 2 or 3, wherein the spacings between said particles are of the same order of magnitude as the dimensions of said particles.

6. Electromagnetic filter according to claim 1, wherein said particles are formed of amorphous metals.

7. Electromagnetic filter according to claim 1, including spheres without particles disposed in said housing in a ratio of 1:1 with said spherical bodies having said particles.

8. Electromagnetic filter according to claim 7, wherein said spherical bodies having said particles are disposed downstream of said spheres without particles in flow direction of the medium.

9. Electromagnetic filter according to claim 7 or 8, wherein said spherical bodies having said particles have smaller diameters than said spheres without particles.

* * * * *